(12) United States Patent
Prasanna Dileep

(10) Patent No.: US 9,740,667 B2
(45) Date of Patent: Aug. 22, 2017

(54) METHOD AND SYSTEM FOR GENERATING PORTABLE ELECTRONIC DOCUMENTS

(71) Applicant: Wipro Limited, Bangalore (IN)

(72) Inventor: Miriyala Sri Venkata Sathya Surya Krishana Prasanna Dileep, Hyderabad (IN)

(73) Assignee: Wipro Limited, Bangalore (IN)

( * ) Notice: Subject to any disclaimer, the term of this patent is extended or adjusted under 35 U.S.C. 154(b) by 156 days.

(21) Appl. No.: 14/945,110

(22) Filed: Nov. 18, 2015

(65) Prior Publication Data

US 2017/0097921 A1    Apr. 6, 2017

(30) Foreign Application Priority Data

Oct. 5, 2015 (IN) .......................... 5327/CHE/2015

(51) Int. Cl.
*G06F 17/00* (2006.01)
*G06F 17/21* (2006.01)
(Continued)

(52) U.S. Cl.
CPC ........ *G06F 17/214* (2013.01); *G06F 17/2264* (2013.01); *G06F 17/2705* (2013.01);
(Continued)

(58) Field of Classification Search
CPC .................................................. G06F 17/2264
See application file for complete search history.

(56) References Cited

U.S. PATENT DOCUMENTS 5,416,898 A * 5/1995 Opstad ................. G06F 17/214
345/468
5,682,158 A * 10/1997 Edberg .................... H03M 7/30
341/106

(Continued)

FOREIGN PATENT DOCUMENTS

WO       2009049275 A1    4/2009

OTHER PUBLICATIONS

Meyer-Lerbs, Lothar, et al, "Glyph Extraction from Historic Document Images," Sep. 2010, DocEng '10: Proceedings of the 10th ACM Symposium on Document Engineering, pp. 227-230.*

*Primary Examiner* — Laurie Ries
(74) *Attorney, Agent, or Firm* — LeClairRyan, a Professional Corporation

(57) ABSTRACT

The present disclosure relates to a method for generating portable electronic documents. The method comprises retrieving key character positions of each syllable, repositioned character and syllable chunks of each syllable of pre-processed electronic document. Then, probable data loss resulting from usage of each syllable chunk of the syllable chunks is determined using corresponding characteristic information associated with each syllable chunk. Each character of each syllable chunk is translated into glyph stream using predetermined glyph mapping based on probable data loss. The glyph stream is restructured using invisible glyphs and composite glyphs. Font data of at least one of invisible and composite glyphs is modified upon restructuring. Then, glyph stream is mapped with predetermined Unicode value of invisible glyphs, composite glyphs, repositioned character and each syllable chunk upon modification. A portable electronic document is generated using modified font data, mapping of the Unicode value and glyph stream of each syllable chunk.

15 Claims, 14 Drawing Sheets

(51) Int. Cl.
*G06F 17/28* (2006.01)
*G06F 17/27* (2006.01)
*G06F 17/22* (2006.01)

(52) U.S. Cl.
CPC ........ *G06F 17/2735* (2013.01); *G06F 17/289* (2013.01); *G06F 17/2854* (2013.01); *G06F 17/2872* (2013.01)

(56) References Cited

U.S. PATENT DOCUMENTS

| | | | | |
|---|---|---|---|---|
| 5,784,071 | A * | 7/1998 | Tang | G06F 17/2223 345/467 |
| 5,809,467 | A * | 9/1998 | Otsuka | G10L 13/08 704/201 |
| 5,910,805 | A * | 6/1999 | Hickey | G06T 11/001 345/467 |
| 7,639,257 | B2 * | 12/2009 | Renner | G06F 17/214 345/467 |
| 8,397,155 | B1 | 3/2013 | Szabo | |
| 2002/0026475 | A1 * | 2/2002 | Marmor | G06F 17/30569 709/203 |
| 2003/0206123 | A1 * | 11/2003 | Robbins | G06F 17/2863 341/27 |
| 2006/0248459 | A1 * | 11/2006 | Su | G06F 3/018 715/703 |
| 2006/0285138 | A1 | 12/2006 | Merz et al. | |
| 2007/0002054 | A1 * | 1/2007 | Bronstein | G06K 9/00463 345/467 |
| 2009/0132384 | A1 * | 5/2009 | Duncan | G06F 17/218 705/26.1 |
| 2009/0300046 | A1 * | 12/2009 | Abouyounes | G06F 17/30265 |
| 2011/0087484 | A1 * | 4/2011 | Lee | G06F 17/27 704/9 |
| 2012/0065959 | A1 * | 3/2012 | Salisbury | G06F 17/2705 704/9 |
| 2013/0253903 | A1 * | 9/2013 | Stephen | G06F 17/27 704/2 |
| 2013/0304604 | A1 * | 11/2013 | Hoffman | G06Q 30/0621 705/26.5 |
| 2015/0106700 | A1 * | 4/2015 | Allawi | G06F 17/24 715/256 |
| 2015/0309966 | A1 * | 10/2015 | Gupta | G06F 17/211 715/247 |

* cited by examiner

Raw text

Identify syllables from writing order of the raw text

Key character positions

FIGURE 6d

Font specific rules applied on the syllable chunks

| | | | | | | |
|---|---|---|---|---|---|---|
| फि | क | क | ् | 120,200 | 200,125 | |
| कि | क | क | ् | 120,200 | 200,125 | |
| इ | ○ ॰ | इ | ○ ॰ | 120,200 | 200,125 | |
| ड | ○ ॰ | ड | ○ ॰ | 120,200 | 200,125 | |

| | | |
|---|---|---|
| वि | क | 234 455 |
| कि | क | 234 455 |
| इ | ड़ | 234 455 |
| ड | ॰ | 234 455 |

FIGURE 9

METHOD AND SYSTEM FOR GENERATING PORTABLE ELECTRONIC DOCUMENTS

This application claims the benefit of Indian Patent Application Serial No. 5327/CHE/2015 filed Oct. 5, 2015, which is hereby incorporated by reference in its entirety.

FIELD

The present subject matter is related, in general to portable electronic documents, and more particularly, but not exclusively to a document converter and a method for generating portable electronic documents.

BACKGROUND

In general, one or more articles include, without limitations, paper documents like newspapers, magazines, and electronic documents, for example Portable Document Format (PDF), word documents, Adobe documents, printed documents, brochure, images, scanned documents, books, etc. The one or more articles may contain scripts having, without limitations, texts, characters, words, images, symbols, and letters etc. in one or more languages include, but are not limited to, Indic, Hebrew, Thai, and Tibetan have complex scripts i.e. Unicode complex scripts. The complex scripts include characters, texts, words, and symbols whose look, shape, and appearances are different and complex as compared to Latin script whose script are straight and simple in fashion. Particularly, complex scripts are different from the Latin script in terms of interpretation and shape of a character, texts, symbols etc. In these complex scripts, the look, shape, position and attachment of a glyph depend on an order of the characters and also on the contextual position of the characters in the text (i.e. what character precedes and/or follows it). Typically, the glyph is an elemental symbol within an agreed set of symbols, intended to represent a readable character for the purposes of writing, and intended to express thoughts, ideas and concepts.

Conventionally, the complex scripts may require complex transformations and processing between text input and text output for rendering and displaying the complex script with proper layout on a display unit of a computing device. Particularly, rendering order of the complex scripts is different than writing order of the complex scripts. In such a case, the complex scripts are reordered to render original texts. However, the complex scripts text reordering is contextual, so there is a possibility of having multiple possible original texts while re-using and/or retrieving the actual original text. Particularly, multiple glyphs are required to be mapped into single or multiple character(s) sequence. A mapping table having mappings of each glyph to the single character or the multiple characters sequence is difficult to be maintained since same glyph can't have multiple character(s) mappings. Additionally, in the conventional method, high processing power and resources are required for rendering the complex scripts, such as fonts, script specific rules, and layout and font engines. Furthermore, such a way of rendering may result data loss where some texts and/or characters may be lost while rendering. In some scenarios, the complex scripts are displayed properly, but sometimes such scripts may not enable the user to reuse or retrieve or parse the script, for example read only text may be generated on which no operation can be performed.

Considering a scenario in which incorrect texts or data are extracted and displayed in a target file when a user wants to use partial or complete portion of text by copying from source PDF file in some other text editor like notepad or wordPad etc. For example, the incorrect text is rendered when a reviewer quotes a portion of text from the source PDF document to a review document by copy-paste operation.

For example, FIG. 1 illustrates an example for rendering an Indic script character for display. In the illustrated FIG. 1, an appearance of an Indic script character changes due to the presence of a symbol namely "Halant" after the Indic script character and the presence of a constant after Halant. That is, in the FIG. 1, an SA character 100 having a Unicode of (U+0938) changes its shape due to a Halant character 102 having a Unicode of (U+094D) after the SA character 100 and the presence of a TA character 104 having a Unicode of (U+0924) after the Halant character 102. Specifically, the right vertical line of the SA character 100 is removed to form the SATA character 106.

Another example of Indic script characters combining to form a singleton ligature is illustrated in FIG. 2. As illustrated in FIG. 2, three initial characters, a JA character 200 having a Unicode of (U+91C), a Halant character 202 having a Unicode of (U+094D), and a NYA character 204 having a Unicode of (U+091E) generate a single GYA character 206. To generate the GYA character 206 the right vertical line of the JA character 200 is removed due to the presence of the Halant character 202 to form a Half JA character 208. Then, the Half JA character 208 is combined with the NYA character 204 to form the final GYA character 206. However, placement of such halant character and/or NYA character may change while displaying or rendering on the display unit due to lack of reordering.

Another example of an alteration of a position of a dependant mark is illustrated in FIG. 3. As illustrated in FIG. 3, a character 300, a constant, having a Unicode of (U+0915) and a character 302, a dependant vowel, having a Unicode of (U+0941) are combined to form the character 304 having a glyph 306. However, the glyph 306 is not in the correct position, thus the glyph 306 is repositioned horizontally along an axis 308 (x axis) to form the final character 310.

In some scenarios, an incorrect output document is rendered when a user wants to convert the source file from PDF to some other format.

In some scenarios, incorrect searches are rendered in terms of locating occurrence or position of a given key word while performing search and navigation when a user wants to search the text (keyword) within the source file. For example, incorrect locations or positions of a keyword are provided when the user wants to navigate to the location where the search keyword exists within the PDF document or when the user wants to find the set of PDF files that matches the given search criteria using a search engine.

In one conventional method, only Unicode value of each character is stored. For example, Consider the text: "kA k^mA [ कृ कॄ ] or [ कै कॆ ]", where Unicode value stream of k, A, ^ and m is stored. For example, say k=0xC95; A=0xCBE; ^=0xCCD; m=0xCAE are stored in form of 0xC95 0xCBE 0xC95 0xCCD 0xCAE 0xCBE. However, in the conventional method, no rendering information i.e. glyph stream values of corresponding characters are stored. Also, such rendering depends on user application and settings.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

In one embodiment, the present disclosure relates to a method for generating portable electronic documents. The method comprises retrieving at least one of key character positions of each syllable, repositioned character of each syllable and one or more syllable chunks of each syllable of a pre-processed electronic document. The method further comprises determining probable data loss resulting from usage of each syllable chunk of the one or more syllable chunks using corresponding characteristic information associated with each syllable chunk. The method further comprises translating each character of each syllable chunk into a glyph stream using a predetermined glyph mapping based on the determined probable data loss resulted from usage of each syllable chunk. The method further comprises restructuring the glyph stream using at least one of invisible glyphs and composite glyphs. The method further comprises modifying font data of at least one of the invisible glyphs and the composite glyphs upon restructuring. The method further comprises mapping the glyph stream with a predetermined Unicode value of at least one of the invisible glyphs, the composite glyphs, the repositioned character and each syllable chunk upon modification. The method further comprises generating a portable electronic document using the modified font data, the mapping of the Unicode value and the glyph stream of each syllable chunk.

In another embodiment, the present disclosure relates to a document converter for generating portable electronic documents. The document converter further comprises a processor and a memory communicatively coupled to the processor, wherein the memory stores processor-executable instructions, which, on execution, cause the processor to perform operations to retrieve at least one key character positions of each syllable, repositioned character of each syllable and one or more syllable chunks of each syllable of a pre-processed electronic document. The processor is configured to determine probable data loss resulting from usage of each syllable chunk of the one or more syllable chunks using corresponding characteristic information associated with each syllable chunk. The processor is configured to translate each character of each syllable chunk into a glyph stream using a predetermined glyph mapping based on the determined probable data loss resulted from usage of each syllable chunk. The processor is configured to restructure the glyph stream using at least one of invisible glyphs and composite glyphs. The processor is configured to modify font data of at least one of the invisible glyphs and the composite glyphs upon restructuring. The processor is configured to map the glyph stream with a predetermined Unicode value of at least one of the invisible glyphs, the composite glyphs, the repositioned character and each syllable chunk upon modification. The processor is configured to generate a portable electronic document using the modified font data, the mapping of the Unicode value and the glyph stream of each syllable chunk.

In another embodiment, the present disclosure relates to a non-transitory computer readable medium including instructions stored thereon that when processed by at least one processor causes a document converter for generating portable electronic documents to perform the act of retrieving at least one of key character positions of each syllable, repositioned character of each syllable and one or more syllable chunks of each syllable of a pre-processed electronic document. The medium further comprises determining probable data loss resulting from usage of each syllable chunk of the one or more syllable chunks using corresponding characteristic information associated with each syllable chunk. The medium further comprises translating each character of each syllable chunk into a glyph stream using a predetermined glyph mapping based on the determined probable data loss resulted from usage of each syllable chunk. The medium further comprises restructuring the glyph stream using at least one of invisible glyphs and composite glyphs. The medium further comprises modifying font data of at least one of the invisible glyphs and the composite glyphs upon restructuring. The medium further comprises mapping the glyph stream with a predetermined Unicode value of at least one of the invisible glyphs, the composite glyphs, the repositioned character and each syllable chunk upon modification. The medium further comprises generating a portable electronic document using the modified font data, the mapping of the Unicode value and the glyph stream of each syllable chunk.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIGS. 6*a* to 6*e* illustrates extraction of syllables, key character positions of syllables and syllable chunks from raw text in accordance with some embodiments of the present disclosure;

FIG. 9 illustrates application of font specific rules to syllable chunk in accordance with some embodiments of the present disclosure;

Figure 1:
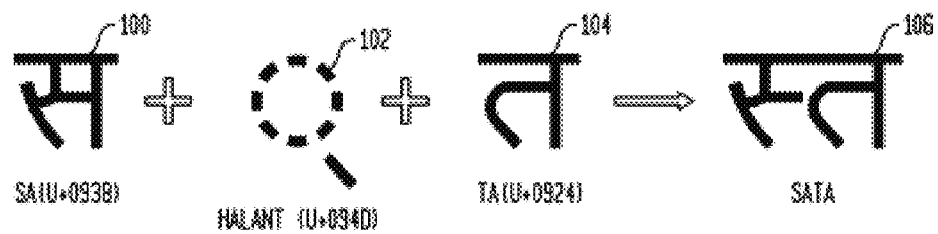
FIGS. 1, 2 and 3 shows conventional scenario for rendering and displaying complex script texts.
Figure 2:
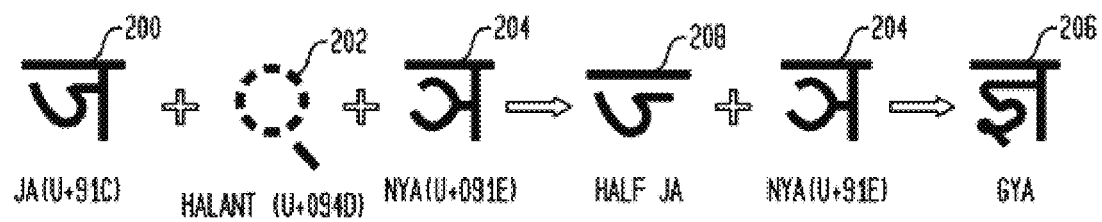
Figure 3:
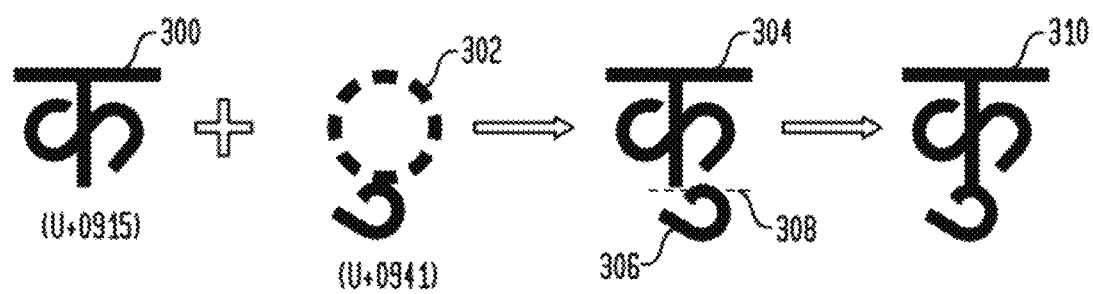

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a document converter for generating portable electronic documents. Particularly, a portable electronic document is generated in which any Unicode complex script of any language from any kind of articles is rendered as its original scripts. In such a case, the Unicode complex script looks or appears as its original script with its original look or appearance in the generated portable electronic document. Also, the portable electronic document is generated in such a way that the script including, without limitations, texts, words, images, characters, symbols, letters, glyphs are not lost or corrupted while rendering the Unicode complex scripts from any kind of articles. Further, the Unicode complex scripts are rendered having no distortion, no compressions of characters so that the Unicode complex scripts appear as its original script. This would enable the user to perform the rendering accurately, where the rendering includes, without limitations, extracting, copying, parsing, searching keywords, reading scripts, recognizing scripts, and other like actions which a user usually performs to render a script. An accurate or nearly accurate rendering is achieved by using composite glyph and/or invisible glyph into embedded font data of the article, for example PDF file.

A method for generating a portable electronic document to achieve an accurate rendering of the Unicode complex script is illustrated herein. The method comprises preprocessing an electronic document. The electronic document may include, without limitations, electronic newspaper, magazines, Portable Document Format, word documents, Adobe documents, printed documents, brochure, images, scanned documents, books etc. Each electronic document may contain scripts having, without limitations, texts, characters, words, images, symbols, syllables and letters etc. in some language. Each script in the electronic document may be of some font name, font style, color, font size, etc. The preprocessing involves perusing the electronic document where the perusing includes, without limitations, scanning and/or reading and/or parsing the scripts. Such perusing is carried out whenever the user performs actions on the electronic document and/or on the scripts of the electronic document. The action of the user may include, without limitations, extract, copy, reading, search, parse etc. After perusing, one or more syllables of textual portions of the electronic document having the complex script Unicode text are identified. Each syllable of the one or more syllables is parsed for identifying key character positions of each syllable. Upon parsing, one or more syllable chunks of each syllable are extracted by repositioning each character of each syllable based on the identified key character positions. In an embodiment, the one or more syllable chunks are extracted using language specific rules and/or font specific rules. In such a way, the electronic document is preprocessed from which the key character positions, the repositioned character and the one or more syllable chunks of each syllable are retrieved. From each syllable chunk, probable data loss is determined using corresponding characteristic information associated with each syllable chunk. The characteristic information associated with each syllable chunk includes, without limitation, writing order of script of each syllable chunk, a character of each syllable chunk being repositioned, a syllable chunk being replaced by a syllable chunk, and a syllable chunk being used to replace a syllable chunk. Based on the probable data loss, each character of each syllable chunk is translated into a glyph stream using a predetermined glyph mapping. The glyph stream resulted from the translation is restructured using invisible glyphs and/or composite glyphs to store glyph stream value in Unicode table. For example, consider a text series: "kA kˆmA" whose rendering series is (kA) (kA)(mˆ). Each character in the text series is mapped to a glyph stream. For example, [G1]=kA, [Y1] is a composite glyph=k, [G2] is an invisible glyph=ˆm, and [X1] is an invisible glyph=A. Therefore, the glyphs series results as [G1] [Y1][G2][X1].

In an embodiment, the restructuring is performed using font specific rules. The restructuring is performed by mapping a predefined dictionary glyph index value associated to corresponding font data of the corresponding syllable chunk and predefined dictionary character value corresponding to the repositioned value. After restructuring, font data of invisible glyphs and/or the composite glyphs are modified. Upon modification, the glyph stream is mapped with a predetermined Unicode value of the invisible glyphs, and/or the composite glyphs, and/or the repositioned character and/or each syllable chunk. For example, the Unicode value 200 is mapped to K+A, the Unicode value 506 is mapped to k, the Unicode value 406 is mapped to ˆm and the Unicode value 802 is mapped to A. such Unicode values are predefined for certain glyph stream. Such mapping is performed using Unicode mapping table and glyph index. Using the mapping of the Unicode value, the glyph stream and the modified font data, a portable electronic document is generated in which complex script Unicode text is rendered and displayed in its original form corresponding to the actions of the user.

Figure 4:
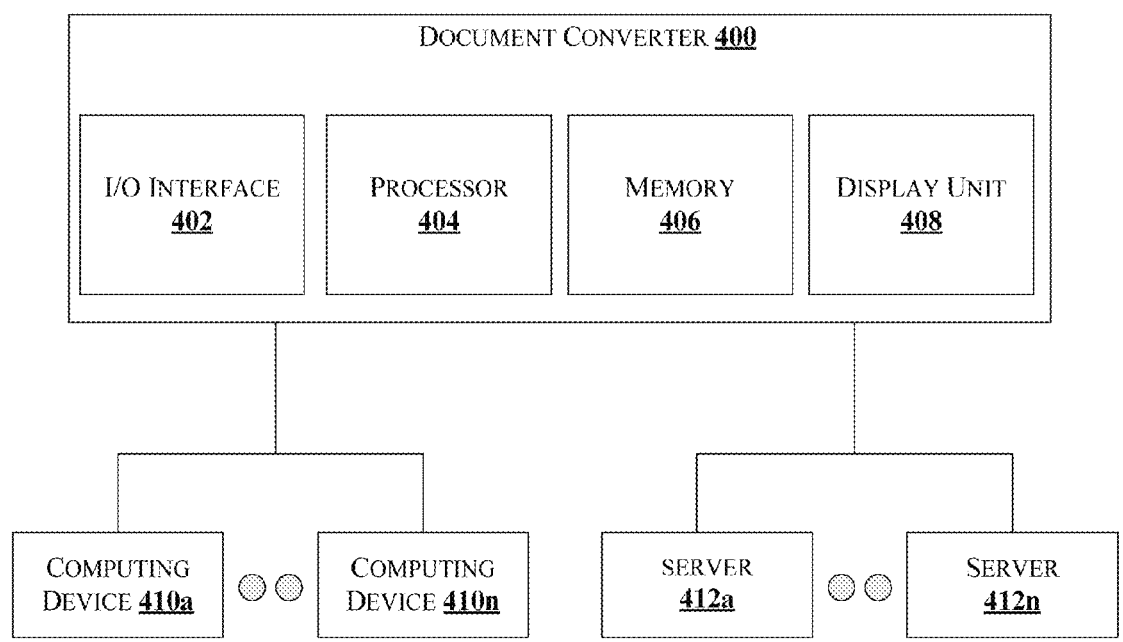
FIG. 4 illustrates an exemplary embodiment of environment for generating portable electronic document having complex Unicode script text in its original form without any data loss i.e. text loss in accordance with some embodiments of the present disclosure.

FIG. 4 illustrates an environment having a document converter 400 being communicatively connected to one or more sources for receiving electronic documents in accordance with some embodiments of the present disclosure. The electronic documents may include, without limitations, electronic newspaper, magazines, Portable Document Format (PDF) documents, word documents, printed documents, brochure, images, scanned documents, books etc. Each electronic document may contain scripts having, without limitations, texts, characters, words, images, symbols, syllables and letters etc. in some language. Each script in the electronic document may be of some font name, font style, color, font size, etc. In one implementation, the document converter 400 is configured to generate a portable electronic document in which the complex script Unicode text is rendered and displayed in its original form without any data loss i.e. text loss. In an embodiment, the one or more sources include, without limitations, one or more computing devices 410a, 410b, . . . , 410n (collectively referred to 410), one or more servers 412a, 412b, . . . , 412n (collectively referred to 412). The one or more computing devices 410 include, but are not limited to, mobiles phones, tablet, notebook, digital cameras, smartphone, wearable device and the like. The one or more computing devices 410 contain the electronic documents in their storage areas, disk memories and local disks etc. In an embodiment, the document converter 400 may be a computing device having the electronic documents in its own storage areas and/or memories. In one implementation, the document converter 400 may acts as a tool or plugin which is configured in the one or more computing devices 410. In such cases, the generation of the portable electronic document takes place in the computing device itself.

The one or more servers 412 store the electronic documents. The electronic documents are accessible or acquired from the one or more servers 412 via one or more ways. The one or more ways include, but are not limited to, Electronic mail (email) of the electronic document, accessing the electronic document through Hyper Text Mark-up Language (HTML), downloading the electronic document from one or more portals associated to the one or more servers 412, copying the electronic document in to a storage unit of a device communicatively connected to the one or more servers 412 etc. In an embodiment, the document converter 400 is configured in the one or more severs 412 for generating the portable electronic documents in which the complex script Unicode text is rendered and displayed in its original form without any data loss i.e. text loss. In such a case, the portable electronic document is generated by the one or more servers 412 and the generated portable electronic document is in turn returned to the one or more computing devices 410 for display.

Referring back to FIG. 4, the document converter 400 comprises an I/O interface 402, a central processing unit ("CPU" or "processor") 404 having one or more processing units, a memory 406 and a display unit 408 in accordance with some embodiments of the present disclosure.

The I/O interface 402 is a medium through which electronic documents are retrieved or received from the one or more computing devices 410 and/or the one or more servers 412. In one implementation, key character positions of each syllable, repositioned character of each syllable and one or more syllable chunks of each syllable are retrieved through the I/O interface 402. In an embodiment, the portable electronic document being generated is provided to the display unit 408 for display through the I/O interface 402. The I/O interface 402 is coupled with the processor 404. The processor 404 is configured to generate the portable electronic document in which the complex script Unicode text is rendered and displayed in its original form without any data loss i.e. text loss.

The processor 404 may comprise at least one data processor for executing program components for processing server-generated electronic documents. The processor 404 is configured to peruse the electronic document. Such perusing is carried out by the processor 404 whenever the user performs actions on the electronic documents and/or on the scripts of the electronic documents. The processor 404 is then configured to preprocess the electronic document which involves identifying one or more syllables of textual portions of the electronic document having complex script Unicode text. In an embodiment, the processor 404 parses each syllable of the one or more syllables for identifying the key character positions of each syllable. The processor 404 extracts the one or more syllable chunks of each syllable by repositioning each character of each syllable based on the identified key character positions. In such a way, the processor 404 generates a preprocessed electronic document. The processor 404 retrieves the key character positions of each syllable, the repositioned character of each syllable and the one or more syllable chunks of each syllable of the pre-processed electronic document. The processor 404 determines probable data loss resulting from usage of each syllable chunk of the one or more syllable chunks using corresponding characteristic information associated with each syllable chunk. The processor 404 translates each character of each syllable chunk into a glyph stream using a predetermined glyph mapping based on the determined probable data loss resulted from usage of each syllable chunk. The processor 404 restructures the glyph stream using at least one of invisible glyphs and composite glyphs. In an embodiment, the processor 404 restructures the glyph stream using font specific rules. Further, in an embodiment, the processor 404 restructures the glyph stream by mapping a predefined dictionary glyph index value associated to corresponding font data of the corresponding syllable chunk and predefined dictionary character value corresponding to the repositioned value with the glyph stream. The processor 404 modifies font data of the invisible glyph and/or the composite glyph upon restructuring. The processor 404 maps the glyph stream with a predetermined Unicode value of the invisible glyphs, the composite glyphs, the repositioned character and each syllable chunk upon modification. The processor 404 generates the portable electronic document using the modified font data, the mapping of the Unicode value and the glyph stream of each syllable chunk. Various functionalities performed by the processor 404 are achieved using one or more modules that are stored in the memory 406 which are explained in below description.

The memory 406 stores instructions which are executable by the at least one processor 404. In an embodiment, the memory 406 stores syllable data, predetermined rules, syllable chunk characteristic information, data loss information, glyph data, Unicode mapping data, glyph index data and other data. In an embodiment, the syllable data, the predetermined rules, the syllable chunk characteristic information, the data loss information, the glyph data, the Unicode mapping data, the glyph index data and other data are stored as one or more data required for generating the portable electronic document having complex script Unicode text in its original form without any data loss i.e. text loss as described in the following description of the disclosure.

Figure 5:
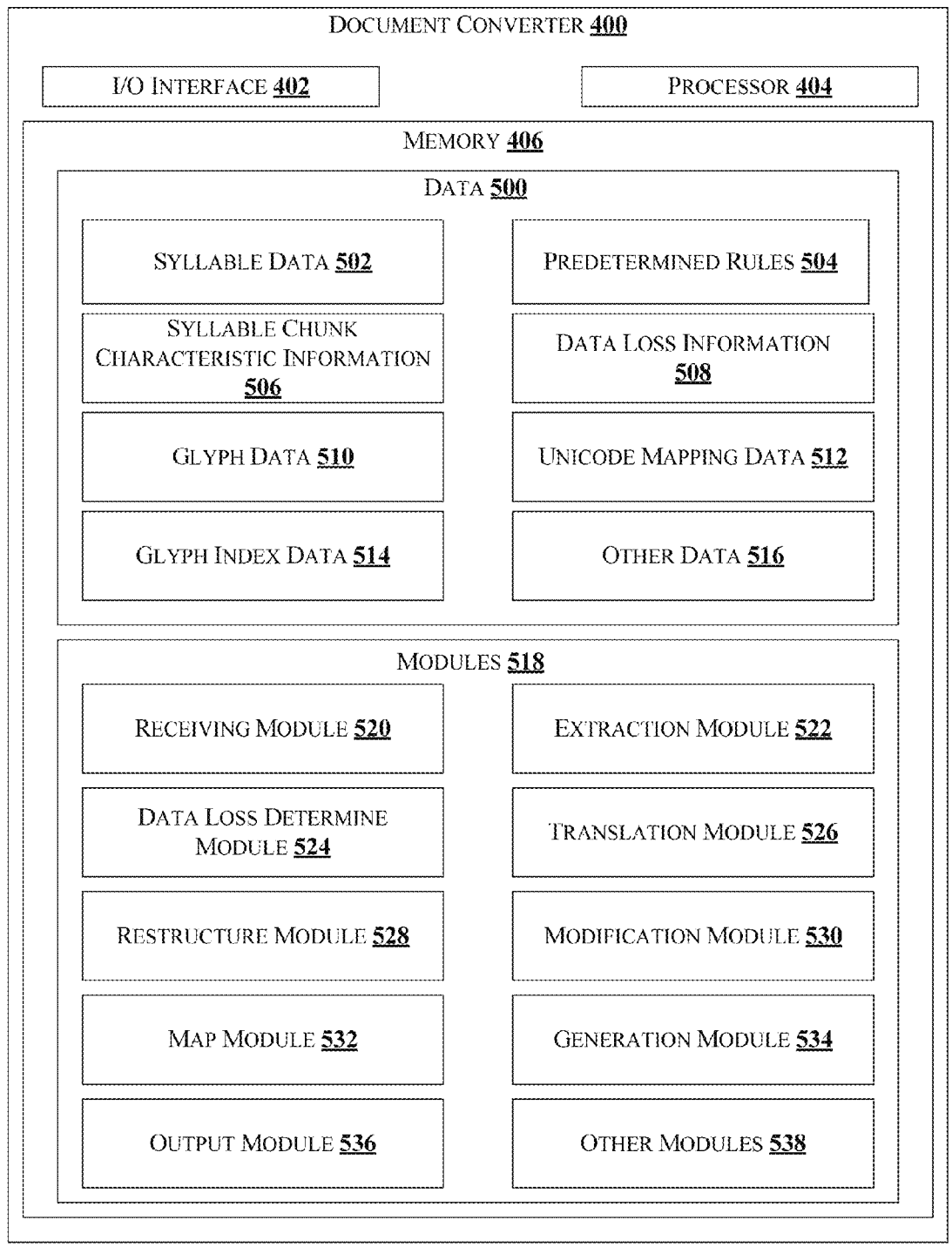
FIG. 5 illustrates a block diagram of the exemplary document converter 400 with various data and modules for generating the portable electronic document having complex script Unicode text in its original form without any data loss i.e. text loss in accordance with some embodiments of the present disclosure.

FIG. 5 illustrates a block diagram of the exemplary document converter 400 with various data and modules for generating the portable electronic document having complex script Unicode text in its original form without any data loss i.e. text loss in accordance with some embodiments of the present disclosure. In the illustrated FIG. 5, the one or more data 500 and the one or more modules 518 stored in the memory 406 are described herein in detail.

In an embodiment, the one or more data 500 may include, for example, the syllable data 502, the predetermined rules 504, the syllable chunk characteristic information 506, the data loss information 508, the glyph data 510, the Unicode mapping data 512, the glyph index data 514 and other data 516 for generating the portable electronic document in which the complex script Unicode text is rendered and displayed in its original form without any data loss i.e. text loss.

The syllable data 502 contains, without limitations, one or more syllables of textual portions of the electronic document corresponding to the complex script Unicode text which are likely to cause data loss, key characters positions of each syllable, characters present in each syllable etc. Further, the syllable data 502 contains one or more syllable chunks of each syllable. Additionally, the syllable data 502 may contain information such as font data that includes, without limitation, font styles, font color, font size, font language of each syllable and of each character in each syllable.

The predetermined rules 504 contain language specific rules and font specific rules. In an embodiment, the language specific rules depend on script of the textual portions i.e. of each syllable and/or of each character in the syllable. The language specific rules are applied on each syllable for obtaining the one or more syllable chunks, for obtaining key character positions of each syllable, for repositioning the characters in the syllable and for reordering the characters in the syllable. The font specific rules include, but are not limited to, Glyph Substitution (GSUB) table rules and Glyph Positioning (GPOS) table rules. In an embodiment, the font specific rules applied on a glyph stream of a syllable chunk and/or on a glyph of a syllable. In such a way, equivalent or resulting glyph to be rendered is defined when a particular sequence of glyphs are found being together.

The syllable chunk characteristic information 506 contains, without limitations, writing order of script of each syllable chunk, a character of each syllable chunk being repositioned, a syllable chunk being replaced by a syllable chunk, and a syllable chunk being used to replace a syllable chunk.

The data loss information 508 contains probability of data loss resulting from each syllable chunk. In an embodiment, such probable data loss is resulted from presently perform glyph to character mapping and their translation to different combinations of glyph streams.

The glyph data 510 contains, without limitations, glyph stream resulted from the translations, glyph mapping data, invisible glyphs and composite glyphs. In an embodiment, the glyph mapping data relates to font specific character to glyph mapping that depends on font to font and/or script to script. The invisible glyphs are glyphs which have no drawing features and have width as zero. The composite glyphs are glyphs which internally refers to one or more simple glyph definitions. For each composite dictionary, a new glyph is created in the font data corresponding to a dictionary value. In an embodiment, the composite glyph is a copy of single glyph whose width and offsets are same as original script.

The Unicode mapping data 512 refers to a Unicode table that contains Unicode values for each glyph, each glyph stream, each character, each syllable etc. In an example, the Unicode value for a glyph is defined as follows. For composite glyph, the Unicode value corresponds to mutated syllable character stream without repositioned. For invisible glyph, the Unicode value corresponds to repositioned character value. For normal glyph, the Unicode value corresponds to logical syllable chunk character stream. For glyph of mutated syllable chunk, the Unicode value corresponds to the composite glyph.

The glyph index data 514 refers to a dynamic glyph index that contains dictionary values and/or index values for each character, each syllable, each glyph, each invisible glyph, each composite glyph, mutated syllable chunk, repositioned character, key character positions and other normal glyph etc.

The other data 516 may refer to such data which can be referred for generating the portable electronic document in which the complex script Unicode text is rendered and displayed in its original form without any data loss i.e. text loss.

In an embodiment, the one or more data 500 in the memory 406 are processed by the one or more modules 518 of the document converter 400. The one or more modules 500 may be stored within the memory 406 as shown in FIG. 4. In an example, the one or more modules 518, communicatively coupled to the processor 404, may also be present outside the memory 406 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 518 may include, for example, a receiving module 520, an extraction module 522, a data loss determine module 524, translation module 526, a restructure module 528, a modification module 530, a map module 532, a generation module 534 and an output module 536. The memory 406 may also comprise other modules 538 to perform various miscellaneous functionalities of the document converter 400. It will be appreciated that such aforementioned modules may be represented as a single module or a combination of different modules.

The receiving module 520 receives the electronic document from the one or more sources i.e. from the one or more computing devices 410 and/or from the one or more servers 412. In an embodiment, the electronic document is considered to be a PDF document or PDF file which contains complex script in languages include, but are not limited to, Hindi, Arabic, Urdu. Particularly, the generation of the portable electronic document without any data loss i.e. text loss is carried out for the complex script which are likely to cause data loss during the action of the user like extracting, parsing, searching, copying and the like.

Figures 6C, 6D:
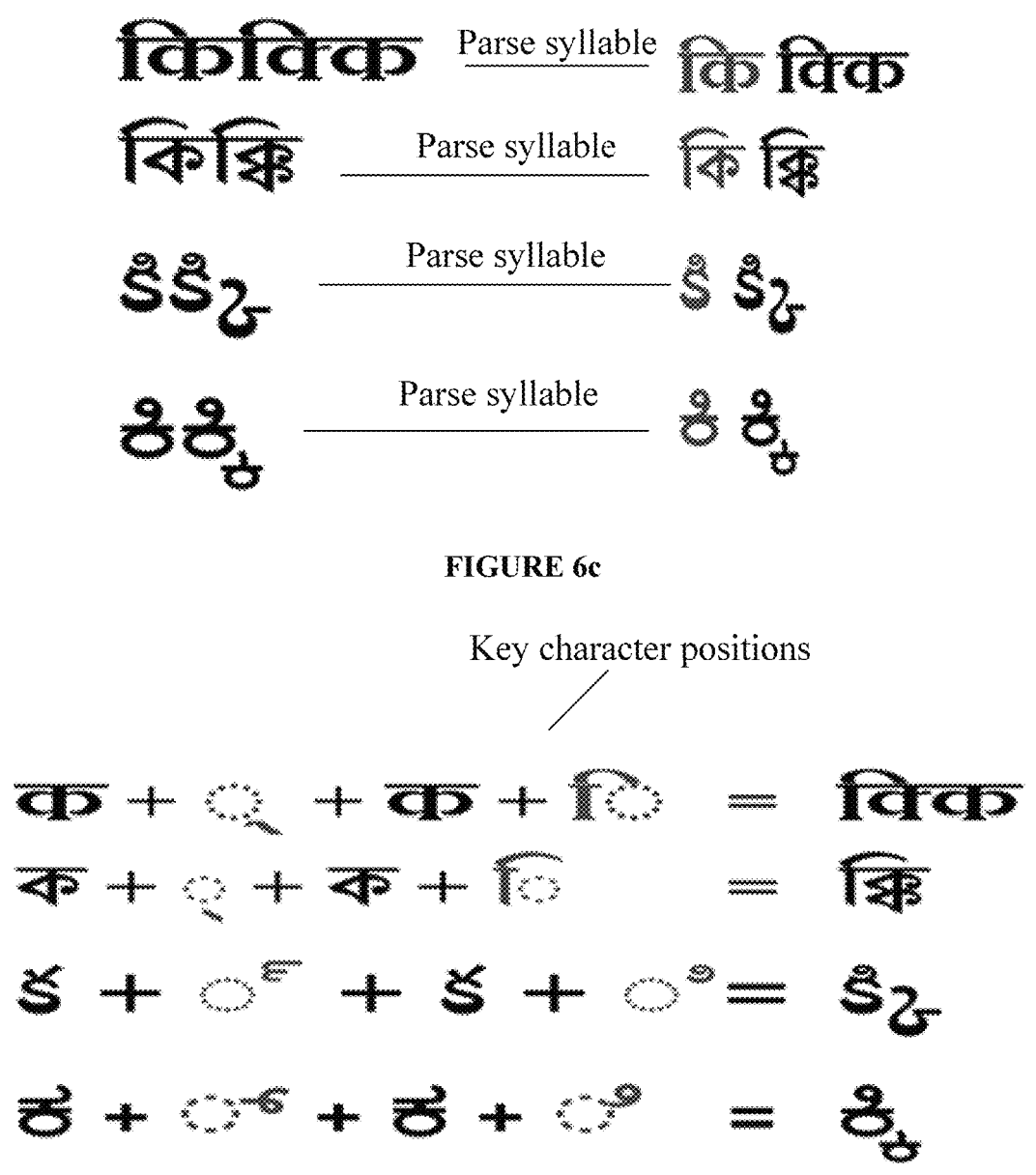
Figure 6E:
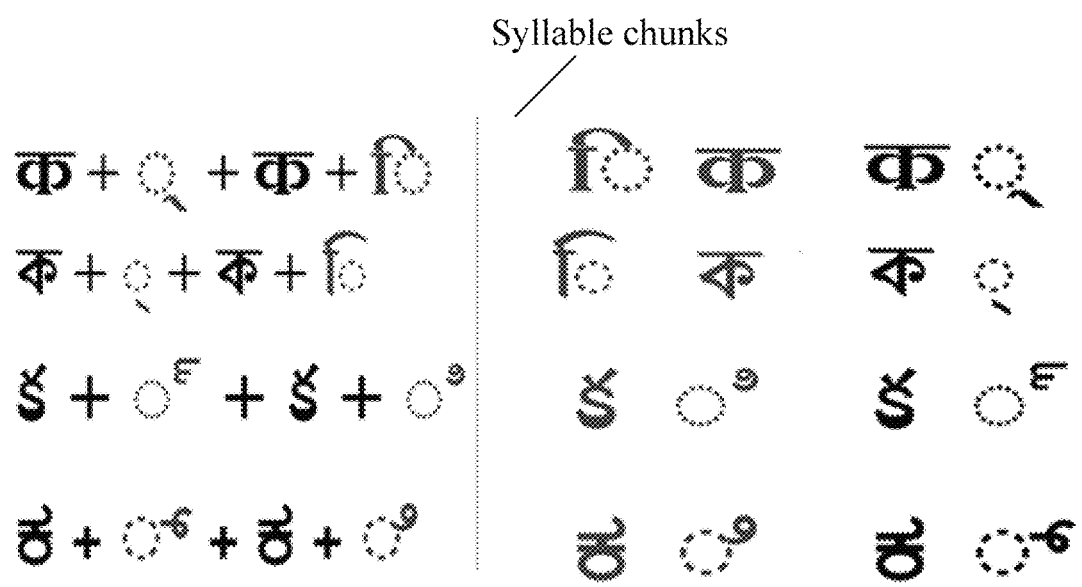

The extraction module 522 preprocesses the electronic document. For preprocessing the electronic document, the extraction module 522 parses and/or scans each textual portion along with the corresponding font data of the textual portion and complex script Unicode texts of the electronic document. From each textual portion, the extraction module 522 identifies the one or more syllables of textual portions of the electronic document having the complex script Unicode text. In an embodiment, identification of the one or more syllables depends from script to script. FIG. 6*a* shows raw texts having complex script of textual portions of the electronic document. From the writing order of the raw texts, the one or more syllables are identified as shown in FIG. 6*b*. Each syllable of the one or more syllables is parsed for identifying the key character positions of each syllable. FIG. 6*c* shows parsing of each syllable where the key character positions of each syllable is identified. In an embodiment, the key character positions are identified based on the language specific rules. FIG. 6*d* shows the identification of the key character positions of each syllable. After parsing, each character of each syllable is repositioned based on the identified key character positions for extracting the one or more syllable chunks. In one implementation, the one or more syllable chunks are extracted using the font specific rules. In an embodiment, for example usually two to four syllable chunks may be extracted from each syllable which depends on the writing script. FIG. 6*e* shows the one or more syllable chunks formed from each syllable. In such a way, the electronic document is preprocessed from which the key character positions, the repositioned character of each syllable and one or more syllable chunks of each syllable are retrieved.

Figure 7A:
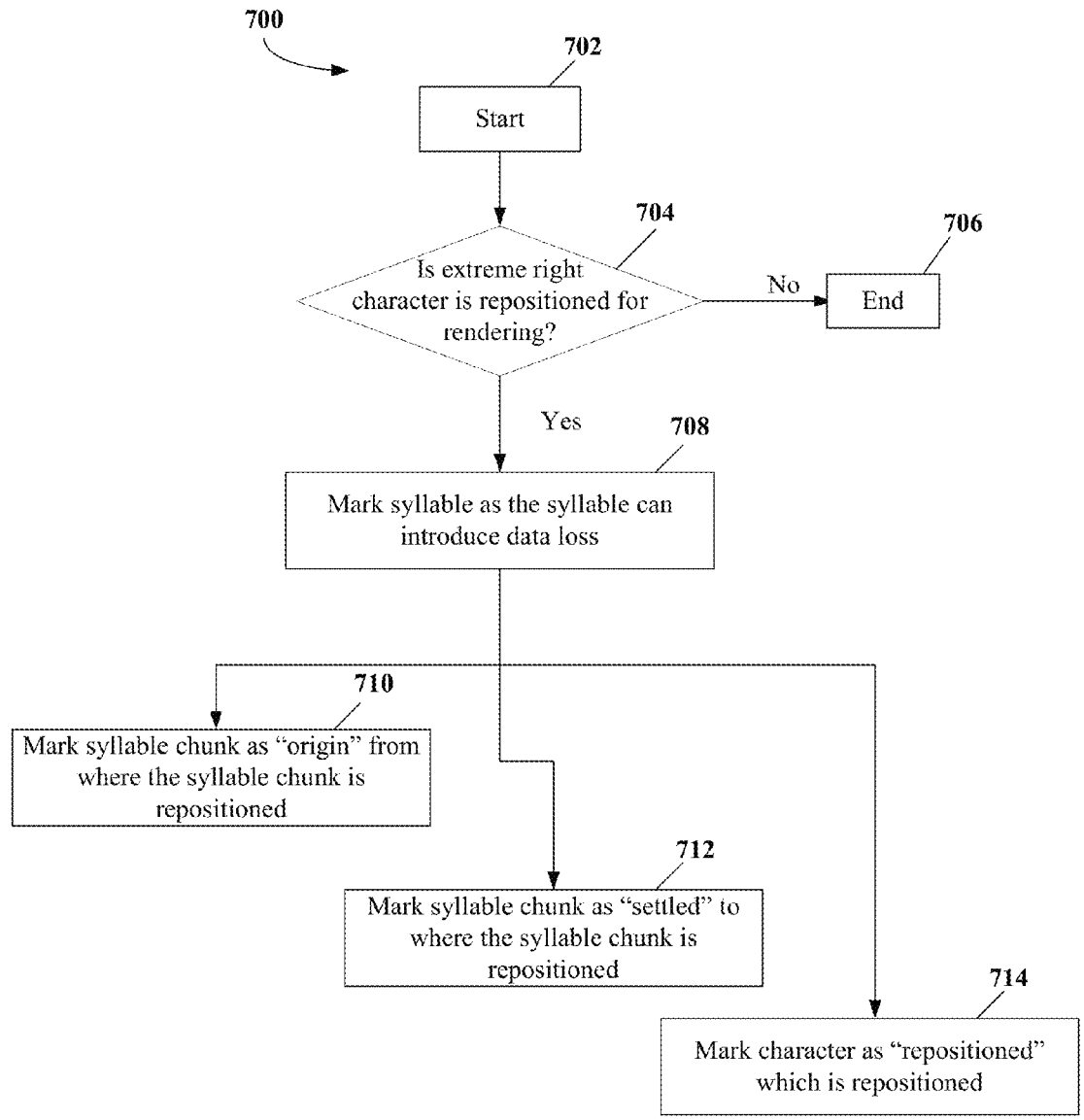
FIGS. 7*a* and 7*b* show exemplary diagrams illustrating determination of probable data loss in accordance with some embodiments of the present disclosure.
Figures 7B, 8:
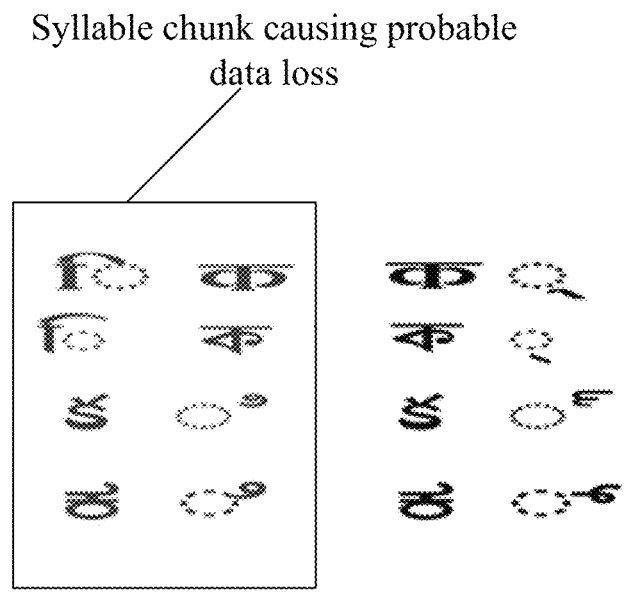
FIG. 8 shows character to glyph mapping in accordance with some embodiments of the present disclosure.

The data loss determine module 524 determines probable data loss resulting from usage of each syllable chunk of the one or more syllable chunks In particular, data loss characteristic of a syllable chunk is determined. In an embodiment, the probable data loss is determined using the corresponding characteristic information associated with each syllable chunk. The characteristic information is stored in the syllable chunk characteristic information 506. In one implementation, predetermined writing script rules are applied for determine repositioned character from which the probable data loss is determined. FIG. 7*a* shows one such writing script rule in a form of flow diagram 700 to determine the probable data loss. From the illustrated FIG. 7*a*, the flow diagram starts at block 702. At block 704, a condition is checked whether an extreme right character in the writing order is repositioned while preparing the one or more syllable chunks. The writing order corresponds to complex scripts not limiting to Devanagari, Hindi, Urdu, Arabic, Telugu and Kannada etc. If the extreme right character is not repositioned, then the flow ends at block 706. But, if the extreme right character is repositioned, then both syllable chunks of the syllable can introduce a data loss as shown at block 708. In such a case, the syllable chunk is marked as "origin" from where the syllable chunk is repositioned as shown at block 710. The syllable chunk is marked as "settled" to where the syllable chunk is repositioned as shown at block 712. The character is marked as "repositioned" which has been repositioned. FIG. 7*b* shows an example illustrating the syllable chunk causing the probable data loss when the extreme right character is repositioned as per flow diagram of FIG. 7*a*. In an embodiment, for right to left writing scripts, extreme left character is considered to be causing the probable data loss.

The translation module 526 translates each character of each syllable chunk into a glyph stream. In an embodiment, the translation to the glyph stream is performed using a predetermined glyph mapping based on the determined probable data loss resulted from usage of each syllable chunk. In one implementation, the predetermined glyph mapping is the font specific character to glyph mapping which is residing in the character to glyph mapping table of a font file. In an embodiment, the character to glyph mapping table defines the glyph position for a given character with in the font. Particularly, the character to glyph mapping table defines the position at which the mathematical representation of a given character shape can be found. In an embodiment, single glyph is mapped to one or more characters but multiple glyphs cannot be mapped to the one or more characters. For example, consider the alphabets "A", "a", "B", "b" whose glyph position is defined as below in table 1.

TABLE 1

| Alphabet | Glyph Position |
|----------|----------------|
| A | 45 |
| A | 90 |
| B | 46 |
| B | 91 |

Based on above table 1, consider the glyph series "Aba" whose glyph positions or values are 45, 91, 90 where 45 is a glyph say G1 for "A", 91 is a glyph say G2 for "b" and 90 is a glyph say G3 for "a". FIG. 8 shows glyph positions or values mapped to each character in each syllable chunk.

The restructure module 528 restructures the glyph stream using the invisible glyphs and/or the composite glyphs. In an embodiment, the restructuring the glyph stream is performed using the font specific rules. Such font specific rules are applied to refine the glyph stream as given in below equation (1)

$$T = \text{Total number of the glyphs existing in a given font is counted} \quad (1)$$

Figure 10:
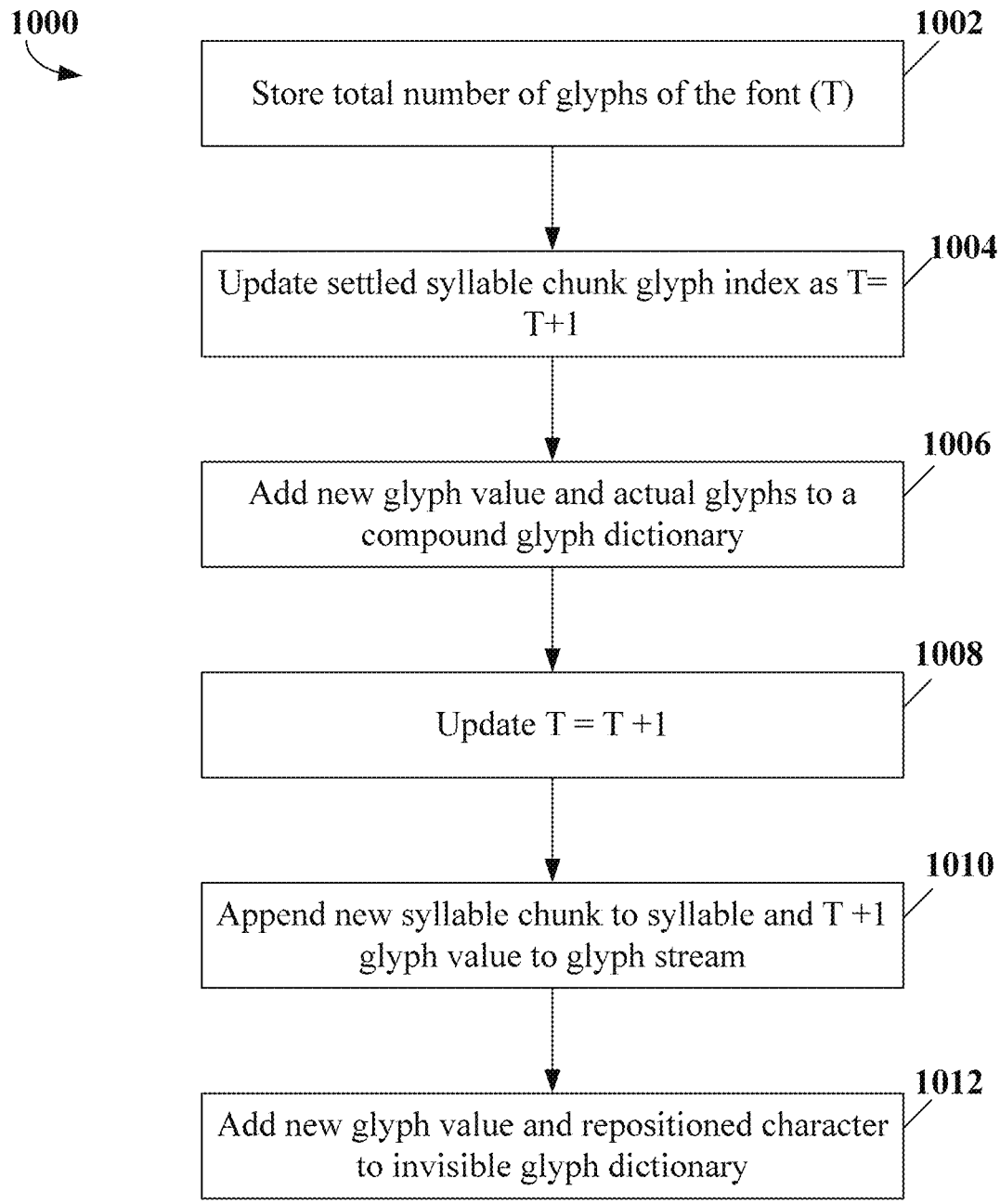
FIG. 10 illustrates restructuring of glyph stream using the composite and invisible glyphs together in accordance with some embodiments of the present disclosure.

In an embodiment, restructuring of the glyph stream using the composite glyph and/or the invisible glyph is performed by mapping the predefined dictionary glyph index value associated to corresponding font data of the corresponding syllable chunk and predefined dictionary character value corresponding to the repositioned value. The restructuring of the glyph stream using the composite and invisible glyphs together is illustrated herein with the help of flow diagram with method 1000 of FIG. 10. At block 1002, a dictionary of distinct resulting glyph index(es) (post application of GSUB and GPOS rules) of settled syllable chunk and next integer of total no. of font glyphs is stored. Then, total number of glyphs is updated to next number i.e. T=T+1 as shown at block 1004. In such a case, the settled syllable chunk's glyphs are updated to T. Such dictionary is used to construct composite glyphs as shown in block 1006. Another dictionary of the distinct repositioned character and next integer of total number of font glyphs is determined and stored. Then, total number of glyphs is updated to next number i.e. T=T+1 as shown at block 1008. A new syllable chunk is created with character being repositioned. At such a case, corresponding glyphs stream is appended with T as shown in at block 1010. Such dictionary is used to construct invisible glyphs as shown at block 1012.

Figure 11:
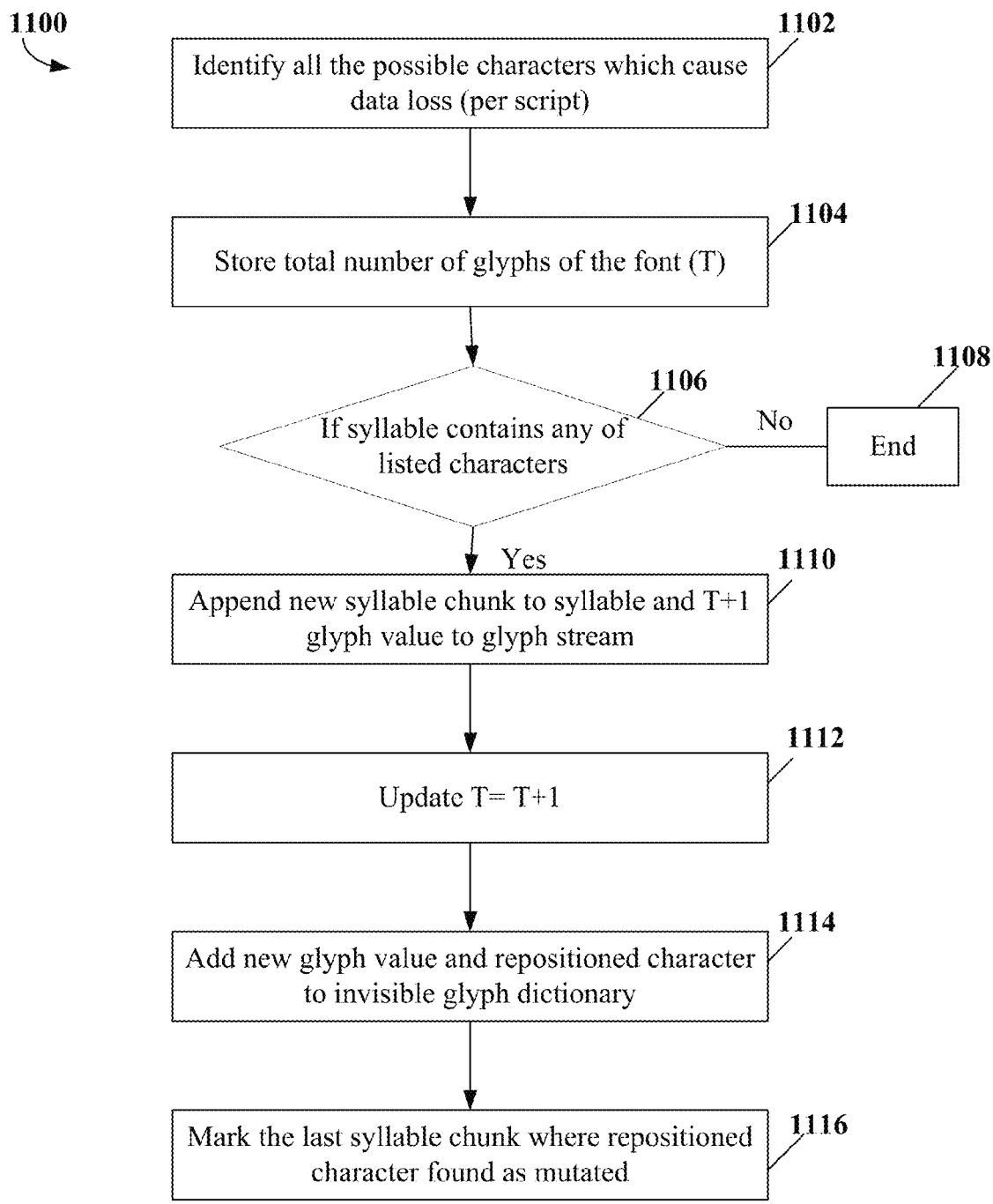
FIG. 11 illustrates restructuring of glyph stream using the invisible glyph in accordance with some embodiments of the present disclosure.
Figure 12:
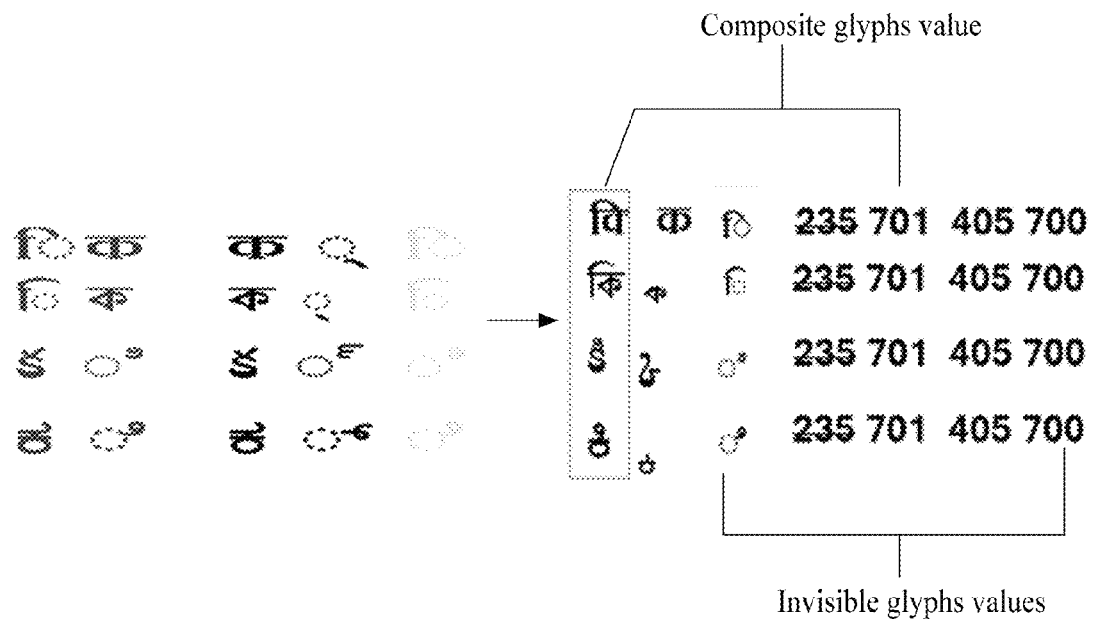
FIGS. 12 and 13 show composite and invisible glyphs values being applied on each syllable chunk in accordance with some embodiments of the present disclosure.

The restructuring of the glyph stream using the invisible glyphs is illustrated herein with the help of flow diagram with method 1100 of FIG. 11. At block 1102, for a given script the list of repositioning characters causing the data loss are identified and for each occurrence of such character in a syllable a new syllable chunk is appended with that re-positioning character. At block 1104, glyphs stream corresponding to repositioned character is appended with T. At block 1106, a condition is checked whether the syllable contains any of the listed characters. If there is no syllable present in the listed characters, then the method ends at block 1108. If there is any syllable present in the listed characters, then new syllable chunk is appended to syllable as shown at block 1110 and then total number of glyphs is updated to next number i.e. T=T+1 as shown at block 1112. At block 1114, a dictionary of the distinct repositioned character and next integer of total number of font glyphs is determined. In such a way, the dictionary is used to construct invisible glyphs as shown at block 1114. At block 1116, the syllable chuck where repositioned character was found is treated as "mutated" syllable chunk. FIG. 12 shows an example illustrating restructuring of glyph stream with composite and invisible glyphs values.

The modification module modifies the font data of the invisible glyph and/or the composite glyph upon restructuring. The fonts can be Open Type font and/or True Type fonts. In an embodiment, such modification of the font data requires updates to font definitions which are not limited to following table entries.

TABLE 2

| Font data | Font definitions |
|---|---|
| Hhea | Head |
| Maxp | Various Max values |
| Head | Header information |
| Loca | Location |
| glyf | Mathematical representation of Shape information |
| Hmtx | Metrics of the Glyph |

Figure 13:
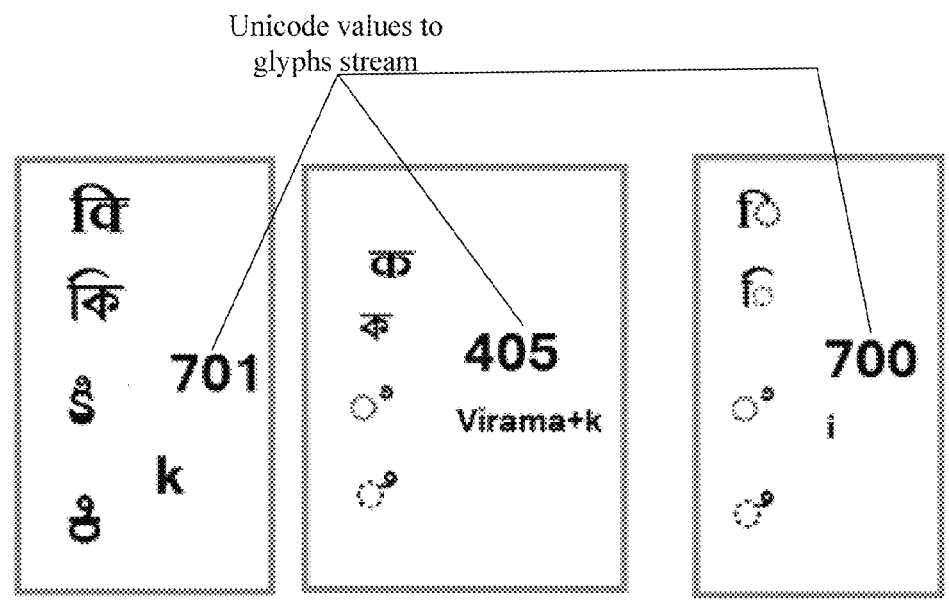

The map module 532 maps the glyph stream with a predetermined Unicode value of the invisible glyphs, the composite glyphs, the repositioned character and each syllable chunk upon modification. FIG. 13 illustrates an example of mapping the Unicode value to the glyph stream.

The generation module 534 generates the portable electronic document using the modified font data, the mapping of the Unicode value and the glyph stream of each syllable chunk.

The output module 536 renders the generated portable electronic document to the display unit 408 for display.

Figure 14:
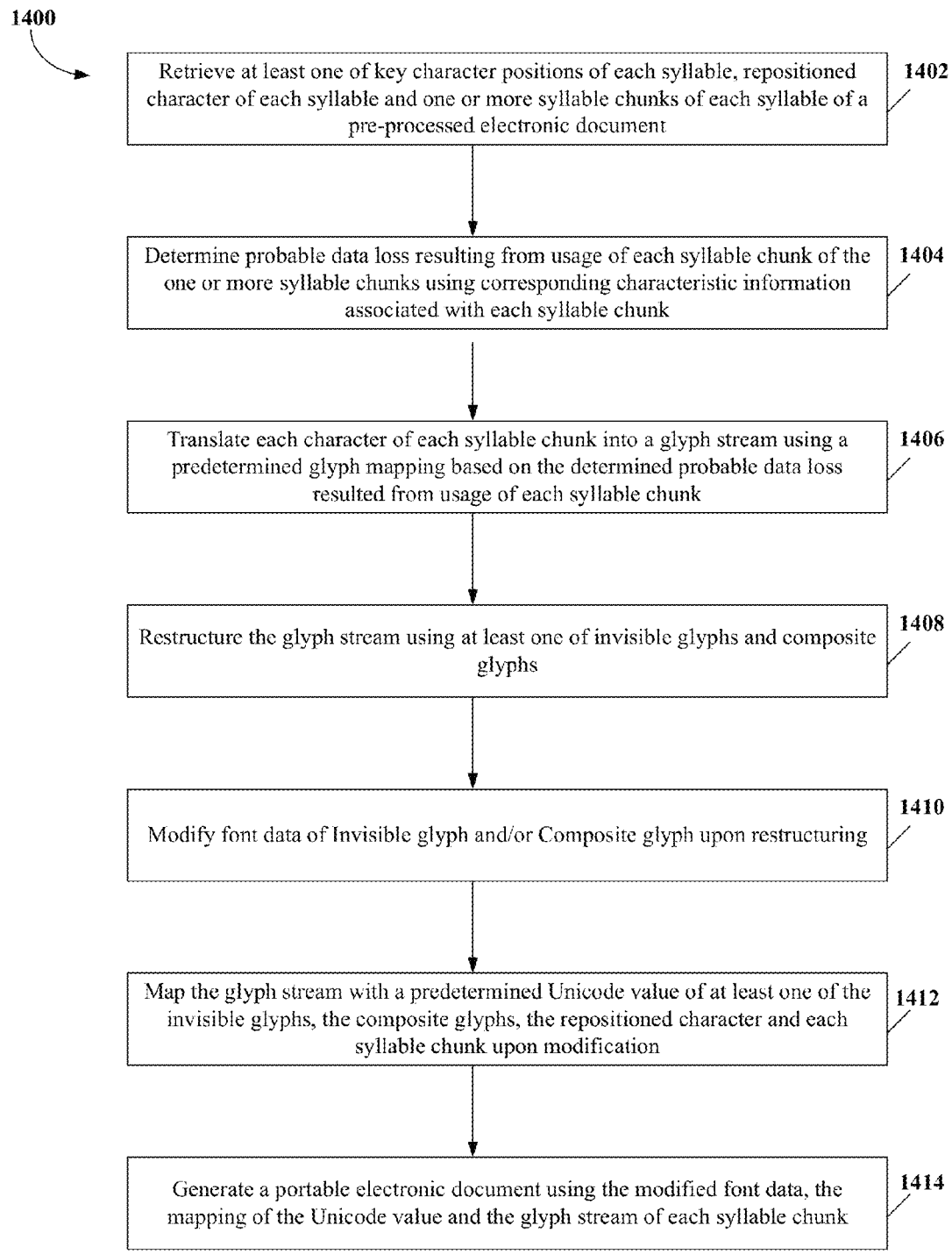
FIG. 14 shows a flowchart illustrating a method for generating portable electronic document having complex Unicode script text in its original form without any data loss i.e. text loss in accordance with some embodiments of the present disclosure.

FIG. 14 shows a flowchart illustrating a method 1400 for generating the portable electronic document in which the complex script Unicode text is rendered and displayed in its original form without any data loss i.e. text loss. in accordance with some embodiments of the present disclosure.

As illustrated in FIG. 14, the method 1400 comprises one or more blocks for generating the portable electronic document in which the complex script Unicode text is rendered and displayed in its original form without any data loss i.e. text loss. The method 1400 may be described in the general context of computer executable instructions. Generally, computer executable instructions can include routines, programs, objects, components, data structures, procedures, modules, and functions, which perform particular functions or implement particular abstract data types.

The order in which the method 1400 is described is not intended to be construed as a limitation, and any number of the described method blocks can be combined in any order to implement the method. Additionally, individual blocks may be deleted from the methods without departing from the scope of the subject matter described herein. Furthermore, the method 1400 can be implemented in any suitable hardware, software, firmware, or combination thereof.

At block 1402, the key character positions of each syllable, the repositioned character of each syllable and the one or more syllable chunks of each syllable of the pre-processed electronic document are retrieved from the one or more sources. In an embodiment, preprocessing the electronic document involves identifying the one or more syllables of textual portions of the electronic document having complex script Unicode text. Then, each syllable of the one or more syllables is parsed for identifying the key character positions of each syllable. The one or more syllable chunks of each syllable are extracted by repositioning each character of each syllable based on the identified key character positions. In an embodiment, the one or more syllable chunks are extracted using at least one of the language specific rules and the font specific rules.

At block 1404, the probable data loss resulting from usage of each syllable chunk of the one or more syllable chunks is determined using corresponding characteristic information associated with each syllable chunk. In an embodiment, the characteristic information associated with each syllable chunk comprises at least one of writing order of script of each syllable chunk, a character of each syllable chunk being repositioned, a syllable chunk being replaced by a syllable chunk, and a syllable chunk being used to replace a syllable chunk.

At block 1406, each character of each syllable chunk is translated into a glyph stream using the predetermined glyph mapping based on the determined probable data loss resulted from usage of each syllable chunk.

At block 1408, the glyph stream is restructured using the invisible glyphs and/or the composite glyphs. In an embodiment, restructuring of the glyph stream is performed using the font specific rules. In an embodiment, restructuring of the glyph stream using the composite glyph and/or the invisible glyph is performed by mapping the predefined dictionary glyph index value associated to corresponding font data of the corresponding syllable chunk and the predefined dictionary character value corresponding to the repositioned value.

At block 1410, the font data of the invisible glyph and/or the composite glyph is modified upon restructuring.

At block 1412, the glyph stream is mapped with the predetermined Unicode value of the invisible glyphs, the composite glyphs, the repositioned character and each syllable chunk upon modification.

At block 1414, the portable electronic document is generated using the modified font data, the mapping of the Unicode value and the glyph stream of each syllable chunk.

Computer System

Figure 15:
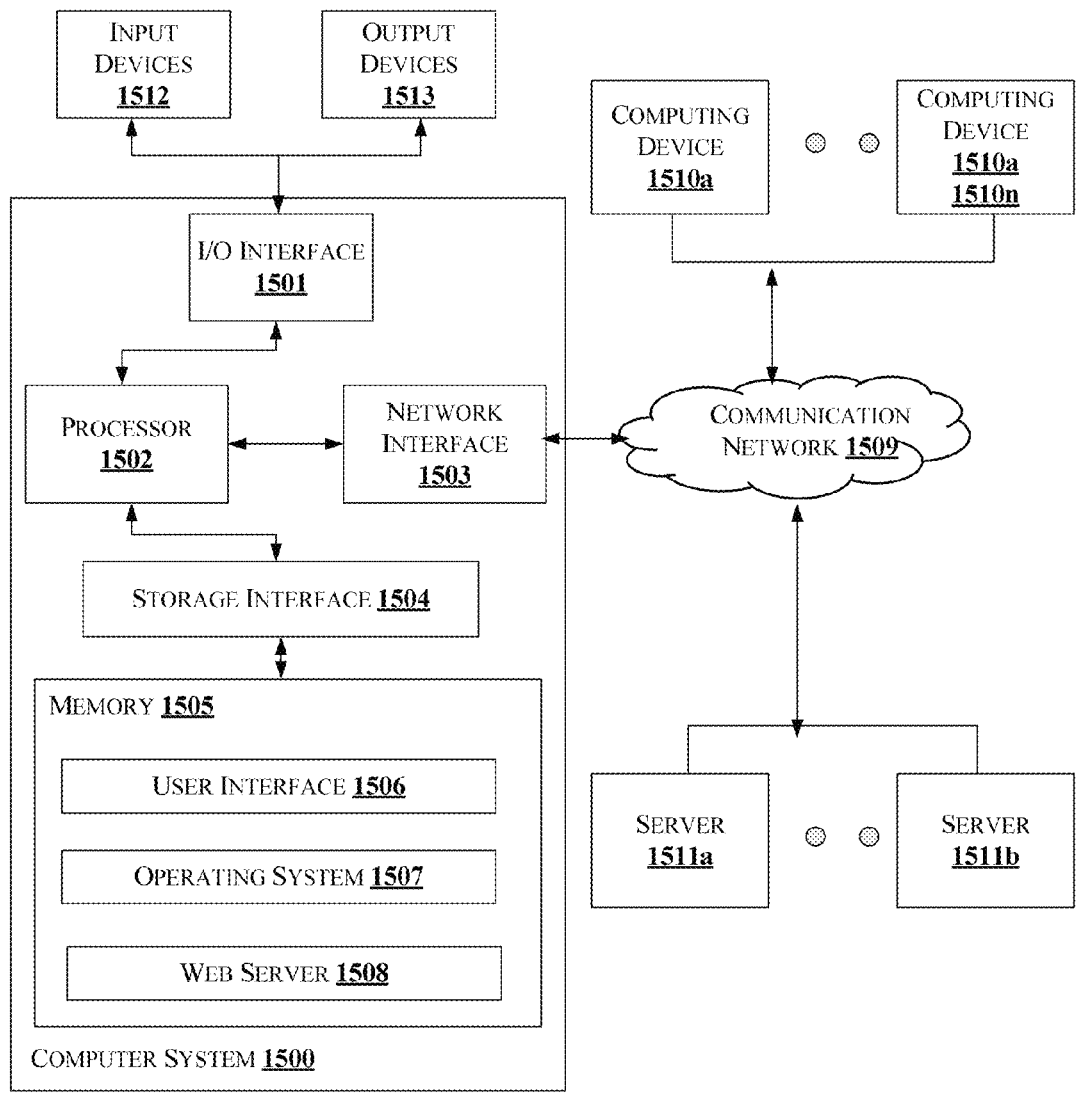
FIG. 15 is a block diagram of an exemplary computer system for implementing embodiments consistent with the present disclosure.

FIG. 15 illustrates a block diagram of an exemplary computer system 1500 for implementing embodiments consistent with the present disclosure. In an embodiment, the computer system 1500 is used to implement the document converter 400. The computer system 1500 may comprise a central processing unit ("CPU" or "processor") 1502. The processor 1502 may comprise at least one data processor for executing program components for executing server generated location information and/or the privacy settings. The processor 1502 may include specialized processing units such as integrated system (bus) controllers, memory management control units, floating point units, graphics processing units, digital signal processing units, etc.

The processor 1502 may be disposed in communication with one or more input/output (I/O) devices (not shown) via I/O interface 1501. The I/O interface 1501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1501, the computer system 1501 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processor 1502 may be disposed in communication with a communication network 1509 via a network interface 1503. The network interface 1503 may communicate with the communication network 1509. The network interface 1503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1509 may include, without limitation, a direct interconnection, local area network (LAN), wide area network (WAN), wireless network (e.g., using Wireless Application Protocol), the Internet, etc. Using the network interface 1503 and the communication network 1509, the system 1500 may communicate with the one or more computing devices 1510a, . . . , 1510n and the one or more servers 1511a, . . . , 1511n through the communication network 1509.

In one implementation, the communication network 1509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc. The network interface 1503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The one or more computing devices 1510a, . . . , 1510n may include, without limitation, personal computer(s), server(s), fax machines, printers, scanners, various mobile devices such as cellular telephones, smartphones, tablet computers, eBook readers, laptop computers, notebooks, gaming consoles, or the like. In an embodiment, the article is acquired from the one or more computing devices 1510a, . . . , 1510n and the one or more servers 1512a, . . . , 1512n.

In some embodiments, the processor 1502 may be disposed in communication with a memory 1505 (e.g., RAM, ROM, etc. not shown in FIG. 15) via a storage interface 1504. The storage interface 1504 may connect to memory 1505 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 1505 may store a collection of program or database components, including, without limitation, user interface application 1506, an operating system 1507, web server 1508 etc. In some embodiments, the computer system 1500 may store user/application data 1506, such as the data, variables, records, etc. as described in this disclosure. Such databases may be implemented as fault-tolerant, relational, scalable, secure databases such as Oracle or Sybase.

The operating system 1507 may facilitate resource management and operation of the computer system 1500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1506 may facilitate display, execution, interaction, manipulation, or operation of program components through textual or graphical facilities. For example, user interfaces may provide computer interaction interface elements on a display system operatively connected to the computer system 1500, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1500 may implement a web browser 1508 stored program component. The web browser 1508 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system Error! Reference source not found.01 may implement a mail server Error! Reference source not found.19 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure establishes a way to map multiple glyphs to stream of one or more Unicode characters by introducing composite and invisible glyph data into embedded font data of the PDF file.

Embodiments of the present disclosure processes the complex script Unicode text at the time of generation of PDF file there by enabling extraction or parsing or copying to result the original text.

Embodiments of the present disclosure extract the original texts without loss/corruption which improves the quality of search ability of documents.

Embodiments of the present disclosure require no human interaction to re-use the text when copied/extracted (from the source PDF file).

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 14 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 400 | Document Converter |
| 402 | I/O Interface |
| 404 | Processor |
| 406 | Memory |
| 408 | Display Unit |
| 410a, . . . 410n | Computing Devices |
| 412a, . . . , 412n | Servers |
| 500 | Data |
| 502 | Syllable Data |
| 504 | Predetermined Rules |
| 506 | Syllable Chunk Characteristic Information |
| 508 | Data Loss Information |
| 510 | Glyph Data |
| 512 | Unicode Mapping Data |
| 514 | Glyph Index Data |
| 516 | Other Data |
| 518 | Modules |
| 520 | Receiving Module |
| 522 | Extraction Module |
| 524 | Data Loss Determine Module |
| 526 | Translation Module |
| 528 | Restructure Module |
| 530 | Modification Module |
| 532 | Map Module |
| 534 | Generation Module |
| 536 | Output Module |
| 538 | Other Modules |
| 1500 | Computer System |
| 1501 | I/O Interface |
| 1502 | Processor |
| 1503 | Network Interface |
| 1504 | Storage Interface |
| 1505 | Memory |
| 1506 | User Interface |
| 1507 | Operating System |
| 1508 | Web Server |
| 1509 | Communication Network |
| 1510a, . . . , 1510n | Computing Devices |
| 1511a, . . . , 1511n | Servers |
| 1512 | Input Devices |
| 1513 | Output Devices |

What is claimed is:

1. A method for generating portable electronic documents, the method comprising:
    retrieving, by a document converter computing device, at least one of key character positions of each syllable, repositioned character of each syllable and one or more syllable chunks of each syllable of a pre-processed electronic document;
    determining, by the document converter computing device, probable data loss resulting from usage of each syllable chunk of the one or more syllable chunks using corresponding characteristic information associated with each syllable chunk;
    translating, by the document converter computing device, each character of each syllable chunk into a glyph stream using a predetermined glyph mapping based on the determined probable data loss resulted from usage of each syllable chunk;
    restructuring, by the document converter computing device, the glyph stream using at least one of invisible glyphs and composite glyphs;
    modifying, by the document converter computing device, font data of at least one of the invisible glyph and the composite glyph upon restructuring;
    mapping, by the document converter computing device, the glyph stream with a predetermined Unicode value of at least one of the invisible glyphs, the composite glyphs, the repositioned character and each syllable chunk upon modification; and
    generating, by the document converter computing device, a portable electronic document using the modified font data, the mapping of the Unicode value and the glyph stream of each syllable chunk.

2. The method as claimed in claim 1, wherein the pre-processed electronic document is received from one or more sources.

3. The method as claimed in claim 2, wherein pre-processing of an electronic document comprises:
    identifying, by the document converter computing device, one or more syllables of textual portions of the electronic document comprising complex script Unicode text;
    parsing, by the document converter computing device, each syllable of the one or more syllables for identifying the key character positions of each syllable; and
    extracting, by the document converter computing device, the one or more syllable chunks of each syllable by repositioning each character of each syllable based on the identified key character positions.

4. The method as claimed in claim 3, wherein the one or more syllable chunks are extracted using at least one of language specific rules and font specific rules.

5. The method as claimed in claim 1, wherein the characteristic information associated with each syllable chunk comprises at least one of writing order of script of each syllable chunk, a character of each syllable chunk being repositioned, a syllable chunk being replaced by a syllable chunk, or a syllable chunk being used to replace a syllable chunk.

6. The method as claimed in claim 1, wherein restructuring the glyph stream is performed using font specific rules.

7. The method as claimed in claim 6, wherein restructuring the glyph stream using the at least one of the composite glyph and the invisible glyph is performed by mapping a predefined dictionary glyph index value associated to corresponding font data of the corresponding syllable chunk and predefined dictionary character value corresponding to the repositioned value.

8. A document converter computing device comprising:
    a processor;
    a memory communicatively coupled to the processor, wherein
    the memory stores processor-executable instructions, which, on execution, cause the processor to:
    retrieve at least one of key character positions of each syllable, repositioned character of each syllable and one or more syllable chunks of each syllable of a pre-processed electronic document;

determine probable data loss resulting from usage of each syllable chunk of the one or more syllable chunks using corresponding characteristic information associated with each syllable chunk;

translate each character of each syllable chunk into a glyph stream using a predetermined glyph mapping based on the determined probable data loss resulted from usage of each syllable chunk;

restructure the glyph stream using at least one of invisible glyphs and composite glyphs;

modify font data of each syllable chunk upon restructuring;

map the glyph stream with a predetermined Unicode value of at least one of the invisible glyphs, the composite glyphs, the repositioned character and each syllable chunk upon modification; and generate a portable electronic document using the modified font data, the mapping of the Unicode value and the glyph stream of each syllable chunk.

9. The document converter as claimed in claim 8 receives the pre-processed electronic document from one or more sources.

10. The document converter as claimed in claim 9, wherein pre-processing of an electronic document comprises:

identify one or more syllables of textual portions of the electronic document comprising complex script Unicode text;

parse each syllable of the one or more syllables for identifying the key character positions; and extract the one or more syllable chunks of each syllable by repositioning each character of each syllable based on the identified key character positions.

11. The document converter as claimed in claim 10, wherein the one or more syllable chunks are extracted using at least one of language specific rules and font specific rules.

12. The document converter as claimed in claim 8, wherein the characteristic information associated with each syllable chunk comprises at least one of writing order of script of each syllable chunk, a character of each syllable chunk being repositioned, a syllable chunk being replaced by a syllable chunk, and a syllable chunk being used to replace a syllable chunk.

13. The document converter as claimed in claim 11, wherein restructuring the glyph stream is performed using the font specific rules.

14. The document converter as claimed in claim 13, wherein restructuring the glyph stream using the at least one of the composite glyph and the invisible glyph is performed by mapping a predefined dictionary glyph index value associated to corresponding font data of the corresponding syllable chunk and predefined dictionary character value corresponding to the repositioned value.

15. A non-transitory computer readable medium including instructions stored thereon that when processed by a processor cause a document converter for generating portable electronic documents to perform acts of:

retrieving at least one of key character positions of each syllable, repositioned character of each syllable and one or more syllable chunks of each syllable of a pre-processed electronic document;

determining probable data loss resulting from usage of each syllable chunk of the one or more syllable chunks using corresponding characteristic information associated with each syllable chunk;

translating each character of each syllable chunk into a glyph stream using a predetermined glyph mapping based on the determined probable data loss resulted from usage of each syllable chunk;

restructuring the glyph stream using at least one of invisible glyphs and composite glyphs;

modifying font data of each syllable chunk upon restructuring;

mapping the glyph stream with a predetermined Unicode value of at least one of the invisible glyphs, the composite glyphs, the repositioned character and each syllable chunk upon modification; and generating a portable electronic document using the modified font data, the mapping of the Unicode value and the glyph stream of each syllable chunk.

* * * * *